US006679035B1

(12) United States Patent
Viaud

(10) Patent No.: US 6,679,035 B1
(45) Date of Patent: *Jan. 20, 2004

(54) BALE WRAPPING IMPLEMENT

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,921

(22) Filed: Apr. 27, 2000

(30) Foreign Application Priority Data

Apr. 28, 1999 (DE) .......................................... 199 19 323

(51) Int. Cl.⁷ ............................................... B65B 11/56
(52) U.S. Cl. ............................. 53/587; 53/556; 53/118; 53/211
(58) Field of Search ........................... 53/556, 179, 211, 53/587, 118, 575

(56) References Cited

U.S. PATENT DOCUMENTS

| 4,499,714 A | * | 2/1985 | Hollmann |
| 4,685,270 A | | 8/1987 | Brambilla |
| 5,398,487 A | * | 3/1995 | Inman et al. .................. 53/575 |
| 5,425,221 A | * | 6/1995 | Pronovost et al. ............. 53/556 |
| 5,483,785 A | * | 1/1996 | DiCarlo ........................ 53/556 |
| 5,551,218 A | | 9/1996 | Henderson et al. |
| 6,082,076 A | * | 7/2000 | Anderson et al. ............. 53/176 |

FOREIGN PATENT DOCUMENTS

| DE | 41 20 733 A1 | 1/1993 |
| DE | 41 38 499 A1 | 5/1993 |
| DE | 42 43 406 A1 | 7/1994 |
| DE | 44 04 225 A1 | 8/1994 |
| WO | WO 96/12399 | 5/1996 |

* cited by examiner

Primary Examiner—Rinaldi I. Rada
Assistant Examiner—Sameh Tawfik

(57) ABSTRACT

A bale wrapping implement includes a main frame supported on a caster wheel mounted at the center of gravity of the device. The main frame is coupled to the axle of a large round baler for vertical pivotal movement so that the wrapping implement is able to follow the contour of the ground. An auxiliary support wheel is mounted to the main frame so that it engages the ground only when the bale wrapping device is supporting a bale to be wrapped. The main frame includes first and second components which are pivotally coupled to each other and a linkage including an extensible and retractable hydraulic actuator is coupled so that a pair of parallel rolls carried by the second component are disposed in a location close to the discharge gate of the baler for receiving a bale when the actuator is extended and are located remote from the gate in a position for wrapping the bale, when the actuator is retracted.

12 Claims, 2 Drawing Sheets

BALE WRAPPING IMPLEMENT

The present invention relates to bale wrapping implements, and more specifically, relates to such implements as are trailed from a large round baler and used to wrap bales ejected onto the device from such baler.

BACKGROUND OF THE INVENTION

Bale wrapping implements are employed for the packaging of bales, preferably bales formed by balers from harvested crop, for example, grass. The packaging results in the relatively small amount of baled silage being enclosed completely in an air-tight material, for example, in foil or sheeting.

DE-A1-41 20 733 shows a bale wrapping implement for the packaging of a bale with foil, the machine including a main frame supported on two wheels arranged close to the baler and an arrangement for wrapping the bale. The main frame is rigidly connected to the baler and includes an adjustable telescoping bale transport frame for the transport of a bale, received from the bale-forming chamber of the baler once the bale discharge gate is opened, to the bale wrapping arrangement.

U.S. Pat. No. 4,685,270, granted to Brambilla on Aug. 11, 1987 shows a bale wrapping implement having a relatively large main frame coupled in trailing relationship to a large round baler for pivoting vertically at its attachment with the baler and supported on a pair of caster wheels.

The problems underlying the invention is seen in the costly configuration of known bale wrapping implements.

SUMMARY OF THE INVENTION

According to the present invention, there is provided a bale wrapping implement that is designed to overcome the drawbacks of the aforementioned prior art bale wrapping devices.

An object of the invention is to provide a bale wrapping implement of simple construction which is coupled in trailing relationship to a baler such as to follow the contour of the ground.

Another object is to provide a bale wrapping implement, as set forth in the immediately preceding object, wherein the main frame includes a first frame component coupled to the baler and a second frame component coupled to the first frame component for horizontal movement relative to the first frame component between a wrapping position spaced from the baler discharge gate, wherein a bale supported by the second component may be wrapped without any interference between a wrapping apparatus and the baler discharge gate, and a bale-receiving position close to said discharge gate, wherein a bale support arrangement carried by the second frame component receives a bale when the latter is discharged from the baler.

A more specific object is to provide a bale wrapping implement, as set forth in the immediately preceding object, wherein a wrapping mechanism is pivotally supported by the first frame component and linked to the second frame component and wherein an extensible and retractable actuator is coupled between the first frame component and said wrapping mechanism so as to cause the wrapping mechanism to pivot together with the second frame component when the second frame component is moved between its bale wrapping and bale receiving positions.

These and other objects will become apparent from a reading of the ensuing description together with the appended drawings.

DESCRIPTION OF THE PREFERRED EMBODIMENT

Figure 1:
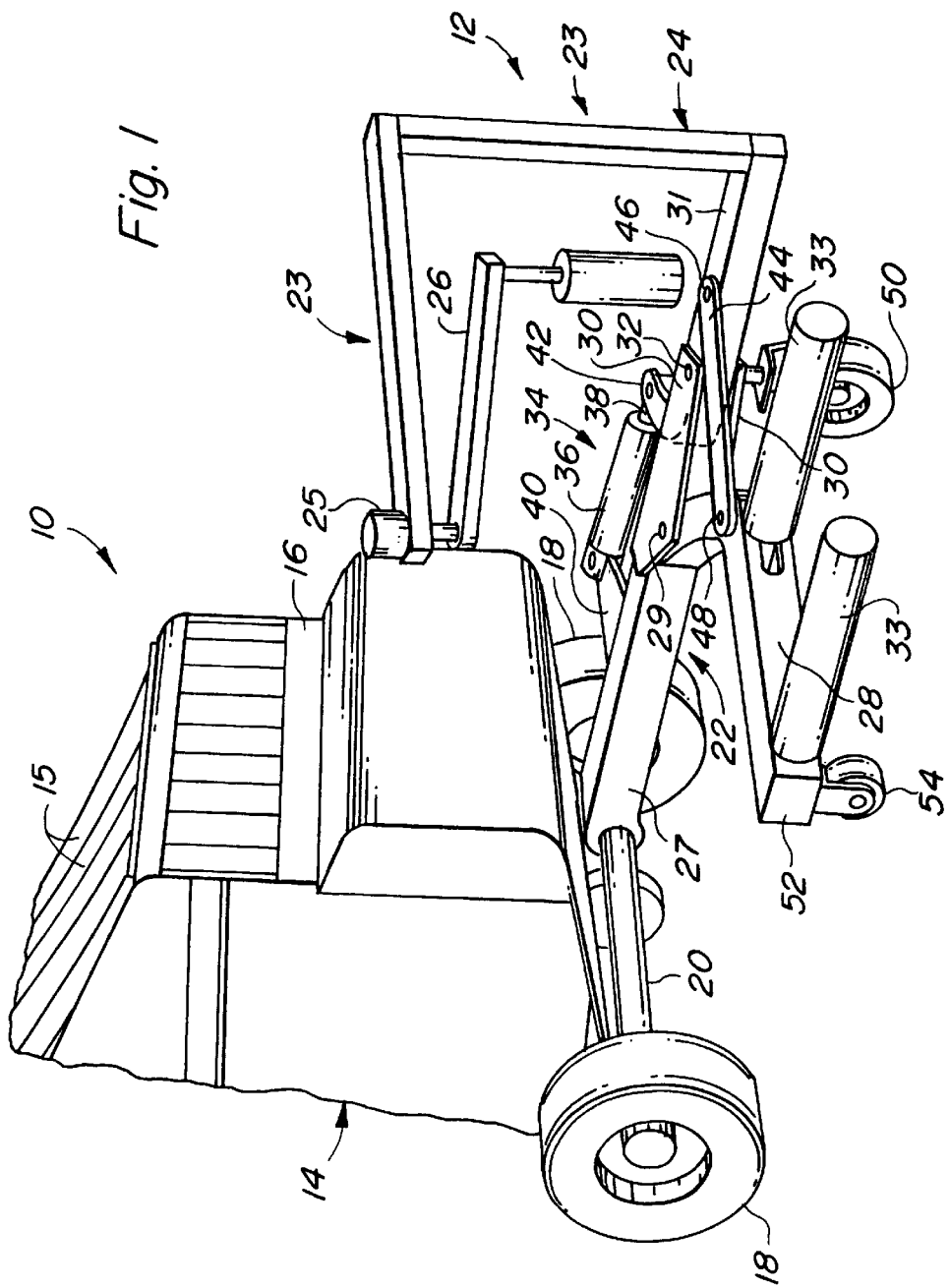
FIG. 1 is a somewhat schematic right rear perspective view showing a bale wrapping implement coupled to a baler with its main frame oriented in a first position assumed for wrapping or packaging a bale.
Figure 2:
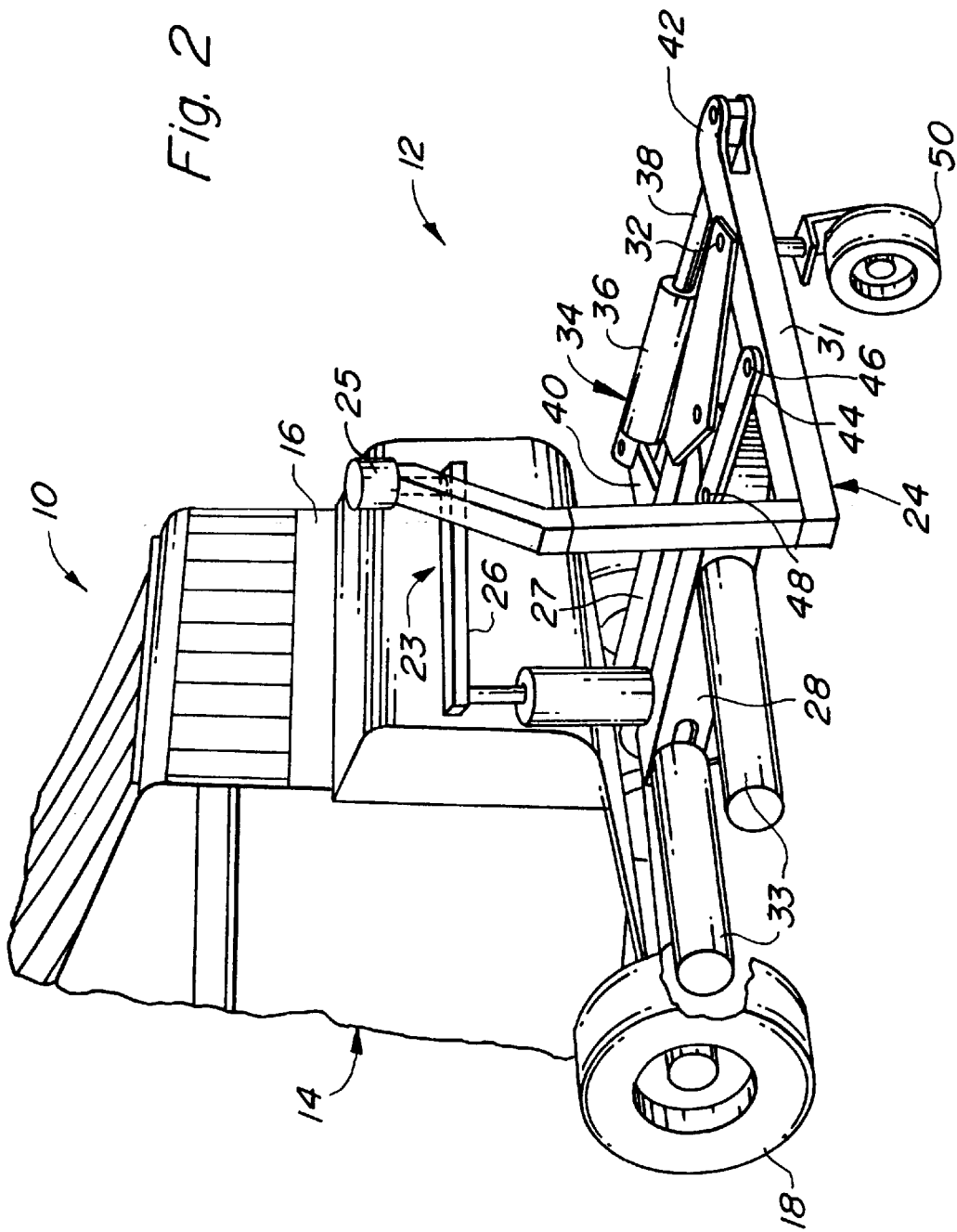
FIG. 2 is a view of the bale wrapping implement, shown in FIG. 1, but with the main frame oriented in a second position assumed for receiving a bale discharged from the baler.

FIGS. 1 and 2 show a baler 10, that can be coupled to a towing vehicle, not shown, such as, for example, an agricultural utility vehicle or an agricultural tractor, with an attached bale wrapping implement 12 for the packaging or wrapping of a bale, not shown, in a preferably air-tight material, such as, for example, a sheet or foil. The baler 10 is preferably configured as a large round baler, however, the employment of a baler for the production of other shapes of bales, for example, parallelepiped bales, is also conceivable The baler 10, shown only partially, is provided with a housing 14 that forms opposite sides of a bale-forming chamber formed in part by a plurality of bale-forming belts 15 supported in side-by-side relationship by a plurality of belt support rolls and other structure (not shown) for effecting the formation of round bales within the baling chamber. Approximately the rear half of the baling chamber is defined by a discharge gate 16, shown here in a lowered closed position, that can be raised about a transverse pivot (not shown), at the upper forward corner of the gate 16, to an open position after the completion of a bale in order to discharge the bale from the bale-forming chamber of the baler 10. The housing 14 is supported on a pair of ground wheels 18 that are rotatably mounted to opposite ends of an axle 20 carried by the housing 14.

The bale wrapping implement 12 includes a main frame 22 supporting a bale wrapping or packaging arrangement 23 including an angular wrapping arm support frame 24 having an upper terminal end supporting a motor 25 having a downwardly projecting output shaft to which a wrapping arm 26 is coupled. Such a wrapping arrangement 23 is described in detail, for example, in DE-A!-41 20 733, published Jan. 7, 1993, the contents of which are incorporated herein by reference.

The frame 22 comprises a first elongate, beam-like frame component 27 having its forward end journalled for pivoting about the axle 20, and a second elongate, beam-like frame component 28 having an angled end received between, and pivotally coupled, as by a vertical pin 29, to a pair of horizontal, vertically spaced plates 30. A horizontal section 31 of the wrapping arm support frame 24 is received between rear portions of the plates 30 and is pivotally coupled to them by a vertical pin 32. A pair of substantially horizontal, parallel rolls 33 are cantilever-mounted from a straight section of the second frame component 28 so as to be spaced from each other for receiving a bale delivered from the baler 10. With reference to FIG. 1, the right-hand roll 33 is mounted for being slid along the second frame component 28 relative to the left-hand roll 33 so that a bale resting on the rolls 33 will drop between them onto the ground after the bale has been wrapped. The rolls 33 can be brought into rotation by drive including a motor, not shown, so that a bale lying upon the rolls 33 will, in turn, be brought into rotation to aid in it being wrapped completely with material dispensed from a supply roll of wrapping material carried at the end of the wrapping arm 26 as the arm 26 is revolved by the motor 25. In place of individual rolls 33, pairs of rolls or rolls in other groupings or a usual wrapping table, on which the bale could be brought into rotation, for example, by a belt drive, could be applied.

An actuator 34 in the form of a double-acting hydraulic motor with a cylinder 36 and a piston rod 38 is provided on the main frame 22. The actuator 34 can be supplied with hydraulic pressure from a pressure source, not shown. The actuator 34 has its cylinder end coupled to a horizontal projection 40 that is joined to the first frame component 27 and extends to the outside of the bale wrapping device 12 and has its rod end coupled to a horizontal projection 42 defined at the end the lower horizontal section 31 of the wrapping arm support frame 24. The lower horizontal section 31 of the wrapping arm support frame 24 is connected through a link 44 with the second frame component 28, the link 44 having its opposite ends respectively pivotally attached, as at vertical pins 46 and 48, to the lower section 31 of the wrapping arm support frame 24, and to the second frame component 28.

The first frame component 27 is supported on the ground by a support wheel 50, configured as a swiveling or pendulous caster, that is, it is supported in bearings in such a way that it can pivot freely about an at least approximately vertical axis, in order to follow the direction of operation pre-set by the towing vehicle or by the baler 10. The caster wheel 50 is here shown as having its swivel axis defined by the pivot pin 32 that defines the pivotal connection between the first frame component 27 and the wrapping arm support frame section 31. The support wheel 50 is arranged at the first frame component 27 in the region of the center of gravity of the bale wrapping device 12 in the unloaded condition, that is, when there is no bale received on the rolls 33. On a free end 52 of the second frame component 28 of the main frame 22, a further smaller auxiliary support wheel 54 is provided that usually does not touch the ground when the bale wrapping device is unloaded and that, in the present embodiment, is configured as a freely swiveling caster wheel. With the support wheel 50 located in the region of the center of gravity of the bale wrapping device 12, torsional loads on the frame 22 are averted.

In operation, when the bale wrapping implement 12 is in a condition not loaded by a round bale and is towed by the baler 10, which is coupled to the towing vehicle, the bale wrapping device 12 is supported on the ground only by the support wheel 50, with the latter conforming automatically to the direction of operation established by the towing vehicle or the baler 10.

The bearing support of the first frame component 27 on the axle 20 of the baler 10 permits vertical pivotal movement of the wrapping implement 12 in order to permit the implement to follow the contour of the ground, with the support wheel 40 always remaining in contact with the ground. The bearing support of the frame component 27 does not permit it to move in the horizontal direction, thereby a reverse operation of the train of baler 10 and bale wrapping implement 12 is possible without leading to a deflection or jackknifing of the bale wrapping implement 12. While the single degree of freedom of motion established by the journalled connection of the main frame component 27 to the axle is preferred, other couplings are possible which would permit horizontal movement, but steps could be taken to lock out such possible horizontal movement.

During the wrapping operation, that is, when the bale wrapping implement 12 is loaded by a bale delivered by the baler 10 after completion of the baling process, the bale wrapping implement 12 may also become supported on the ground by the auxiliary support wheel 54. Due to the additional weight of the bale, the auxiliary support wheel 54 can also briefly come into contact with the ground, for example, on soft ground, since the frame 22 can deflect torsionally in the region of its inherent flexibility. The frame 22 can then be supported on the ground by the auxiliary wheel 54, in order to prevent excessive twisting of the frame 22 and any ensuing damage.

The operation of the wrapping implement 12 is hereinbelow briefly stated. The frame 22 of the bale wrapping implement 12 can be repositioned by the actuator 34 between a receiving position shown in FIG. 2 and a wrapping position shown in FIG. 1. For this purpose, the actuator 34 is supplied with pressure by the hydraulic pressure source, not shown, whereupon the piston rod 38 is extended or retracted in the cylinder 36. If the piston rod 38 is retracted, the frame 22 is in the wrapping position shown in FIG. 1, in which the first frame component 27 and the second frame component 28 cooperate to define an L-shape. In this position, the second frame component 28 is located at such a spacing to the discharge gate 16 of the baler 10 that a bale lying on the rolls 33 can be brought into rotation by the rolls 33, which are driven in a manner not shown, and can be wrapped with material by the arrangement 23, without any interference by the discharge gate 16. The discharge gate 16 can again be closed, in order to enable the formation of a new bale in the baler 10.

In order to simplify the delivery of a bale to the bale wrapping device after the completion of the baling process and opening of the discharge gate 16, the second frame component 28, together with the rolls 33, are brought closer to the discharge gate 16. For this purpose, the piston rod 38 of the actuator 34 is extended, whereby the wrapping arm support frame 24, and with it also the second frame component 28, are respectively pivoted about the pivot pins 29 and 32, with the second frame component 28 preferably moving through approximately 90°, so that it becomes positioned alongside the first frame component 27, and the rolls 33 are arranged, corresponding to the illustration in FIG. 2, in such a way that the bale delivered by the baler 10 can be received by the rolls 33. Following this, the piston rod 38 of the actuator 34 is retracted so that the wrapping process can be performed in the L-shaped arrangement of the frame 22 shown in FIG. 1 and wherein the discharge gate 16 can be closed.

A repositioning of the actuator 34 can be initiated simply, for example, by the operator of the towing vehicle, not shown, in which the operator, for example, actuates a switch for activating an electromagnetic valve, so that either a region on one side, or a region on another side, of a piston coupled to the piston rod 38 is supplied with pressure fluid. But it is also conceivable that the extension and retraction of the piston rod 38 of the actuator 34, and thereby a change in the position of the second frame component 28 relative to the first frame component 27, can be controlled as a function of the operating condition of the baler 10. For example, the repositioning into the position shown in FIG. 2 can be performed by an extension of the piston rod 38 of the actuator 34 when a sensor provided on the baler 10 reports that the baling or binding process is completed. For this purpose, the output value of the sensor can be received by a control unit, which controls an electromagnetic valve, again corresponding to the manual actuation described above, through which the actuator 34 is supplied with pressure.

After the completion of the wrapping process, the right-hand roll 33, as viewed in FIG. 1, can be slid or otherwise brought into its position spaced at its greatest distance from the left-hand roll 33, so that the wrapped bale resting on the rolls 33 is deposited on the ground. The bale remains lying on the ground in this position, while the towing vehicle with the baler 10 and the attached bale wrapping implement 12 moves on. A repositioning of the roll 33 can be performed, for example, by a hydraulic motor or another drive. This can also be attained simply by means of a lock that is released after the completion of the wrapping process, whereby the roll 33 slides on the basis of the weight of the bale against the force of a spring. After the bale is deposited, the spring returns the roll 33 into its initial position, in which the lock is again closed. The opening and closing of the lock can also be performed by the control arrangement, for example, by an electromagnetic switch. It is also possible that the individual operations are performed or controlled by an operator, for example, by the driver of a towing vehicle.

What is claimed is:

1. In a bale wrapping implement adapted for being coupled in trailing relationship to a baler, said implement including a main frame having a first frame component carrying a bale wrapping device and having a forward end defined by a coupling adapted for connection to the baler, said main frame further including a second frame component including a bale-receiving arrangement adapted for supporting a bale when discharged from the baler, at least one support wheel connected to said main frame, and a connecting assembly connecting said second frame component to said first frame component for being selectively moved between a bale-receiving position, wherein said bale-receiving arrangement is disposed for receiving a bale discharged from said baler, and a bale-wrapping position, wherein said bale-receiving arrangement is disposed in such relationship to said bale wrapping device that a bale carried by it may be wrapped without interfering with operations of the baler, the improvement comprising: said connecting assembly establishing a connection allowing said second frame component to be swung substantially horizontally between said bale-receiving and bale-wrapping positions relative to said first frame component.

2. The bale wrapping implement, as defined in claim 1, wherein said connecting assembly establishes a single upright pivot joint between said first and second frame components and about which said second frame component is pivotable.

3. The bale wrapping implement, as defined in claim 1, and further including an actuating linkage including at least one actuating device coupled for selectively swinging said second frame component relative to said first frame component as permitted by said connection established by said connecting assembly.

4. The bale wrapping implement, as defined in claim 3, wherein said actuating linkage includes a wrapping arm support frame pivotally coupled to said first frame component; and said actuating device being coupled between said first frame component and said wrapping arm support frame.

5. The bale wrapping implement, as defined in claim 4, wherein said actuating linkage includes a link having opposite ends respectively coupled to said wrapping arm support frame and said second frame component.

6. The bale wrapping implement, as defined in claim 1, wherein said first frame component extends fore-and-aft; said second frame component having an end pivotally attached to a rear location of said first frame component for pivotal movement about a first upright axis; an actuating linkage including an extensible and retractable actuator coupled between said first and second frame components; said bale-receiving arrangement being in said wrapping position wherein it is displaced rearward of said first frame component when said actuator is retracted, and being in said bale-receiving position wherein it is located alongside said first frame component, when said actuator is extended.

7. The bale wrapping implement, as defined in claim 1, wherein said bale-receiving arrangement includes at least two elongate, parallel rolls.

8. The bale wrapping implement, as defined in claim 7, wherein one of said rolls is mounted for selective movement perpendicular to another one of said rolls, whereby a bale supported on said one and another of said rolls may fall to the ground between them.

9. The baling wrapping implement, as defined in claim 7, and further including an actuator linkage connected between said first and second frame components and including an extensible and retractable actuator; said first frame component being essentially defined by a fore-and-aft extending first beam member; and said second frame component being defined essentially by a second beam member having a straight section; and said straight section of said second frame component extending transversely so as to define an L-shape with said first frame component when said actuator is retracted, and said straight section of said second portion of said main frame being positioned alongside said first portion of said frame when said actuator is extended.

10. The bale wrapping implement, as defined in claim 9, wherein a rear section of said first frame component is defined by upper and lower horizontal plates; said second frame component having an end located between and coupled to a forward location of said plates for pivoting about said first upright axis; a wrapping arrangement including a generally horizontal wrapping arm support frame section located between and pivotally coupled to a rearward location of said plates for pivoting about a second upright axis; said operating linkage including a link having opposite ends respectively pivotally coupled to said wrapping arm support frame section and said second frame component; and said extensible and retractable actuator having opposite ends respectively coupled to said first frame component and to said wrapping arm support section.

11. The bale wrapping implement, as defined in claim 10, wherein one of said rolls is mounted for movement along said straight section of said second component of said frame, whereby said one of said rolls may be moved relative to the other of said rolls for permitting a bale supported on the rolls to fall onto the ground.

12. In a bale wrapping implement adapted for being coupled in trailing relationship to a baler, said implement including a frame having a forward end adapted for being coupled to a baler in such a way that it can be pivoted vertically, and a support wheel arrangement being coupled to said main frame for supporting it on the ground, the improvement comprising: said support wheel arrangement including only one support wheel mounted for continuous engagement with the ground during all conditions of operation of said wrapping implement.

* * * * *